(12) United States Patent
Atmats

(10) Patent No.: US 12,416,257 B2
(45) Date of Patent: Sep. 16, 2025

(54) OPPOSED-PISTON INTERNAL COMBUSTION ENGINE

(71) Applicant: APEX DYNAMICS, SIA, Riga (LV)

(72) Inventor: Uldis Atmats, Riga (LV)

(*) Notice: Subject to any disclaimer, the term of this patent is extended or adjusted under 35 U.S.C. 154(b) by 0 days.

(21) Appl. No.: 18/834,237

(22) PCT Filed: Jan. 27, 2023

(86) PCT No.: PCT/LV2023/050001
§ 371 (c)(1),
(2) Date: Jul. 30, 2024

(87) PCT Pub. No.: WO2023/149793
PCT Pub. Date: Aug. 10, 2023

(65) Prior Publication Data
US 2025/0101908 A1   Mar. 27, 2025

(30) Foreign Application Priority Data
Feb. 2, 2022   (LV) ................. P2022000007

(51) Int. Cl.
*F02B 75/28* (2006.01)
*F02B 33/22* (2006.01)

(52) U.S. Cl.
CPC ............ *F02B 75/282* (2013.01); *F02B 33/22* (2013.01)

(58) Field of Classification Search
CPC ........ F02B 75/28; F02B 75/282; F02B 33/22; F01B 7/14; F01B 7/02; F01B 1/02
See application file for complete search history.

(56) References Cited

U.S. PATENT DOCUMENTS 5,213,067 A * 5/1993 Kramer ................. F02B 75/041
                                                     123/78 F
9,790,846 B2 * 10/2017 Pirault ..................... F01B 7/14
(Continued)

FOREIGN PATENT DOCUMENTS

CN   113090383 A * 7/2021 ............. F02B 23/08
DE   2931298 A1   10/1983
(Continued)

OTHER PUBLICATIONS

EPO Search Report;Apr. 12, 2023.

*Primary Examiner* — Grant Moubry
(74) *Attorney, Agent, or Firm* — Patshegen IP; Moshe Pinchas

(57) ABSTRACT

The present invention relates to internal combustion engines, to opposed-piston internal combustion engines in particular.
The opposed-piston internal combustion engine comprises a working cylinder and an adjacently-located compressor cylinder. The working cylinder comprises a first working piston and a second working piston, an inlet port and an outlet port formed on the working cylinder, a spark plug and a fuel injection nozzle arranged in the working cylinder, a first crankshaft and a second crankshaft. The engine also comprises a crankshaft transmission coupling the first crankshaft with the second crankshaft. The compressor cylinder comprises a first compressor piston and a second compressor piston, an air-exchange port in order to provide the inflow and outflow of air from the compressor cylinder, and a compressed-air overflow channel providing forcing of the compressed air to the working cylinder.

5 Claims, 13 Drawing Sheets

(56) References Cited

U.S. PATENT DOCUMENTS

| | | | |
|---|---|---|---|
| 10,718,263 B2* | 7/2020 | Alonso | F01M 1/14 |
| 11,131,255 B1* | 9/2021 | Yuan | F02D 15/04 |
| 2009/0151663 A1 | 6/2009 | Pastor Alvarez | |
| 2015/0068492 A1 | 3/2015 | Fuqua et al. | |
| 2018/0128203 A1 | 5/2018 | Koeberlein et al. | |
| 2021/0239039 A1* | 8/2021 | Collett | F02B 25/08 |

FOREIGN PATENT DOCUMENTS

| | | |
|---|---|---|
| DE | 9209897 U1 | 11/1992 |
| GB | 2030217 A | 4/1980 |
| RU | 2737461 C1 | 11/2020 |

* cited by examiner

OPPOSED-PISTON INTERNAL COMBUSTION ENGINE

TECHNICAL FIELD

The present invention relates to internal combustion engines, to opposed-piston internal combustion engines in particular.

DESCRIPTION OF PRIOR ART

An opposed-piston internal combustion engine has been described in the publication No. US2018/128203 of the USA patent application. The described opposed-piston internal combustion engine comprises three working cylinders, where there is a first working piston and a second working piston in each working cylinder. The three first working pistons, in their turn, are connected to a first crankshaft through their rods, and the three second working pistons are connected to a second crankshaft through their rods. Both crankshafts are coupled through a gear transmission. A similar construction, but with one working cylinder, has been described in the publication No. CA2645325 of the Canadian patent application.

An opposed-piston internal combustion engine further comprising a screw compressor for the delivery of compressed air to the working cylinder has been described in the publication No. US2009/0151663 of the USA patent application in its turn. A similar opposed-piston internal combustion engine with a screw compressor has been described in the publication No. US2015068492 of the USA patent application. Another similar design of two stroke opposed-piston engine is disclosed in UK patent application publication No. GB2030217.

Taking into consideration the previously-mentioned prior art, the objective is to form a more efficient opposed-piston internal combustion engine.

DESCRIPTION OF THE INVENTION

The objective of the invention can be achieved by forming an opposed-piston internal combustion engine comprising a working cylinder with a first working piston and a second working piston, a first crankshaft and a second crankshaft, where the first working piston is connected to the first crankshaft through a first working rod, and the second working piston is connected to the second crankshaft through a second working rod. The engine comprises an inlet port formed on the working cylinder in the stroke area of the second working piston and an outlet port formed on the working cylinder in the stroke area of the first working piston. The engine also comprises a spark plug arranged in the central portion of the working cylinder and a fuel injection nozzle also arranged in the central portion of the working cylinder.

The engine comprises at least three spark plugs evenly distributed along the circumference of the working cylinder. Likewise, the engine can comprise at least two fuel injection nozzles evenly distributed along the circumference of the working cylinder. In another embodiment of the invention the engine can comprise six spark plugs, although the engine comprises two fuel injection nozzles or three fuel injection nozzles.

The inlet port can consist of several inlet ports evenly distributed along the circumference of the working cylinder, thereby providing an even and all-embracing air inflow. The outlet port, in its turn, can consist of several outlet ports evenly distributed along the circumference of the working cylinder, thereby providing an even and all-embracing air outflow. Furthermore, the inflow can be effected through a non-return air inlet valve.

The engine comprises a compressor cylinder located adjacent to the working cylinder. A first compressor piston and a second compressor piston are arranged in the compressor cylinder, where, like in the working cylinder with the working pistons, the compressor piston heads are opposed to each other. The first compressor piston is connected to the first crankshaft through a first compressor rod, and the second compressor piston is connected to the second crankshaft through a second compressor rod. Both—the working pistons and the compressor pistons—are arranged on the same crankshafts, respectively, providing a mechanical coupling between the strokes of the working pistons and the strokes of the compressor pistons generating compressed air for the working cylinder. In order to provide this fluid communication between the compressor piston and the working piston, the engine comprises an air-exchange port formed in the central portion of the compressor cylinder and configured such as to provide the air inflow and outflow from the compressor cylinder, and a compressed-air overflow channel providing a fluid connection between the compressor cylinder and the working cylinder such that air compressed in the compressor cylinder can be moved to the working cylinder through the inlet port of the working cylinder. The air-exchange port can consist of several air-exchange ports evenly distributed along the circumference of the compressor cylinder, thereby providing an even and all-embracing air inflow and outflow.

Synchronization of the first and second crankshafts is provided by a crankshaft transmission. The crankshaft transmission couples the first crankshaft with the second crankshaft. The crankshaft transmission can be a chain transmission, a belt transmission, including a gear belt transmission or a gear transmission.

The specific opposed-piston internal combustion engine is characterised in that the shift of the phase of the first working rod, specifically the neck of the rod, of the first crankshaft from the phase of the second working rod, specifically the neck of the rod, of the second crankshaft is in the range from 15 to 75 degrees, preferably from 40 to 50 degrees, more preferably 45 degrees. This shift exactly allows the combustion gases that have completed work to leave the combustion chamber of the cylinder before the beginning of the ventilation process of the combustion chamber of the cylinder. Due to the previously-mentioned phase shift it is possible to create a conditional turbocharging effect at the end of the ventilation cycle, which is gained by using the linear speed of the different working pistons, by closing the inlet and outlet ports at certain working moments. Such a structure ensures that the combustion chamber is freed of exhaust gases by 100%.

The above-mentioned turbocharging effect can be observed on the moment when after the ignition of the combustible mixture the working pistons move to the bottom dead centre (BDC). The outlet port opens, and the major part of gases flow out through it. The inlet port opens gradually, and the overpressure created by the compressor results in a draught effect—the combustion chamber of the working cylinder is completely freed of combustible gases. The outlet port closes, however, the inlet port is still slightly open, and the final blow, which can be conditionally perceived as a pressure charger, produced by the compressor flows into the working cylinder through it.

Furthermore, the shift of the phase of the compressor rod of the second crankshaft from the phase of the second working rod of the same second crankshaft is in the range from 80 to 150, preferably from 105 to 115 degrees, more preferably from 107 to 110 degrees.

The structure of the above-mentioned engine, compared to other two-stroke engines, allows utilization of oil-free fuel, thereby providing cleaner exhaust gases.

The first working piston, the cylinder, and the second working piston define the combustion chamber. The head of each working piston in its cross-section has a shape of a truncated cone with concaved lateral sides—a deltoid shape. Wherein on the head of each working piston recesses radially extending from the central portion of the head to the sides of the head are formed as flow deflectors. The radially extending recesses are oriented such as to connect with the inlet and outlet ports during the respective movement.

The deltoid shape of the heads of the working pistons provides that when the working pistons are located at the top dead centre (TDC) a working chamber of a toroidal shape is formed. Thereby at the end of the compression cycle, for example, two, fuel injection nozzles deliver the optimal fuel amount directly into the toroidal space of the working chamber. Furthermore, the fuel injection nozzles can be arranged with an offset from the cylinder centre axes lines, as a result of which fuel is injected in the working chamber below the perimeter, thus enhancing mixing between fuel and air.

The exhaust circuit comprises a resonator and a silencer. A catalyst can be further optionally used.

The engine can be considered a two-stroke engine. Hence it has the litre capacity and the constructive combustion chamber leak-tightness characteristic for two-stroke engines.

A LIST OF DRAWINGS

The drawings, through examples, describe different embodiments of the invention that fall within the scope of protection of the invention described in the claims.

FIG. 1 illustrates the opposed-piston internal combustion engine having a cut body for the sake of visibility. Thereby, the engine assemblies and its components are clearly visible. FIG. 1 shows a condition when both working pistons (10; 20) are at the bottom dead centre (BDC).

A DETAILED DESCRIPTION OF THE EXAMPLES OF THE IMPLEMENTATION OF THE INVENTION

Figure 1:
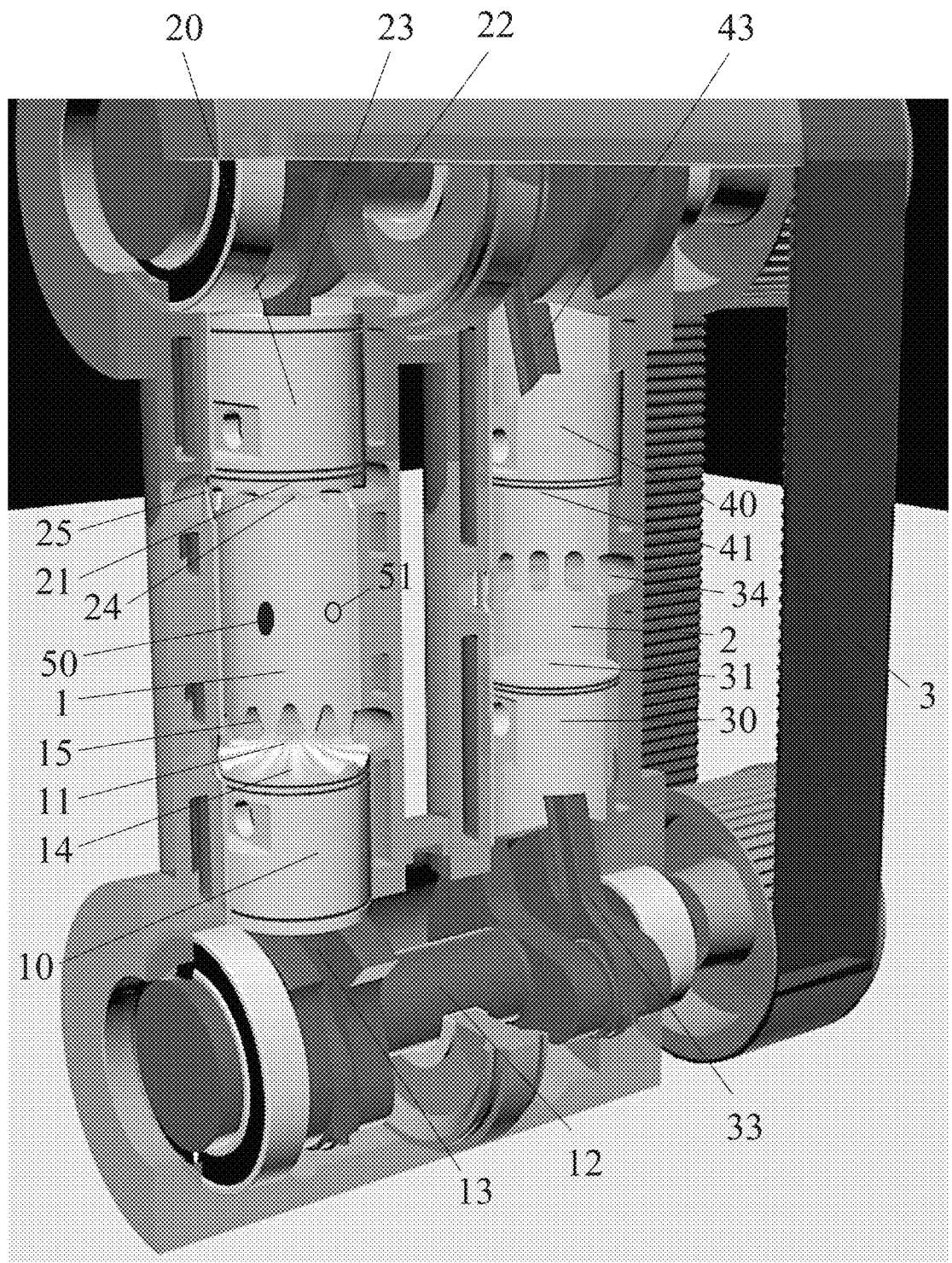
Figure 2:
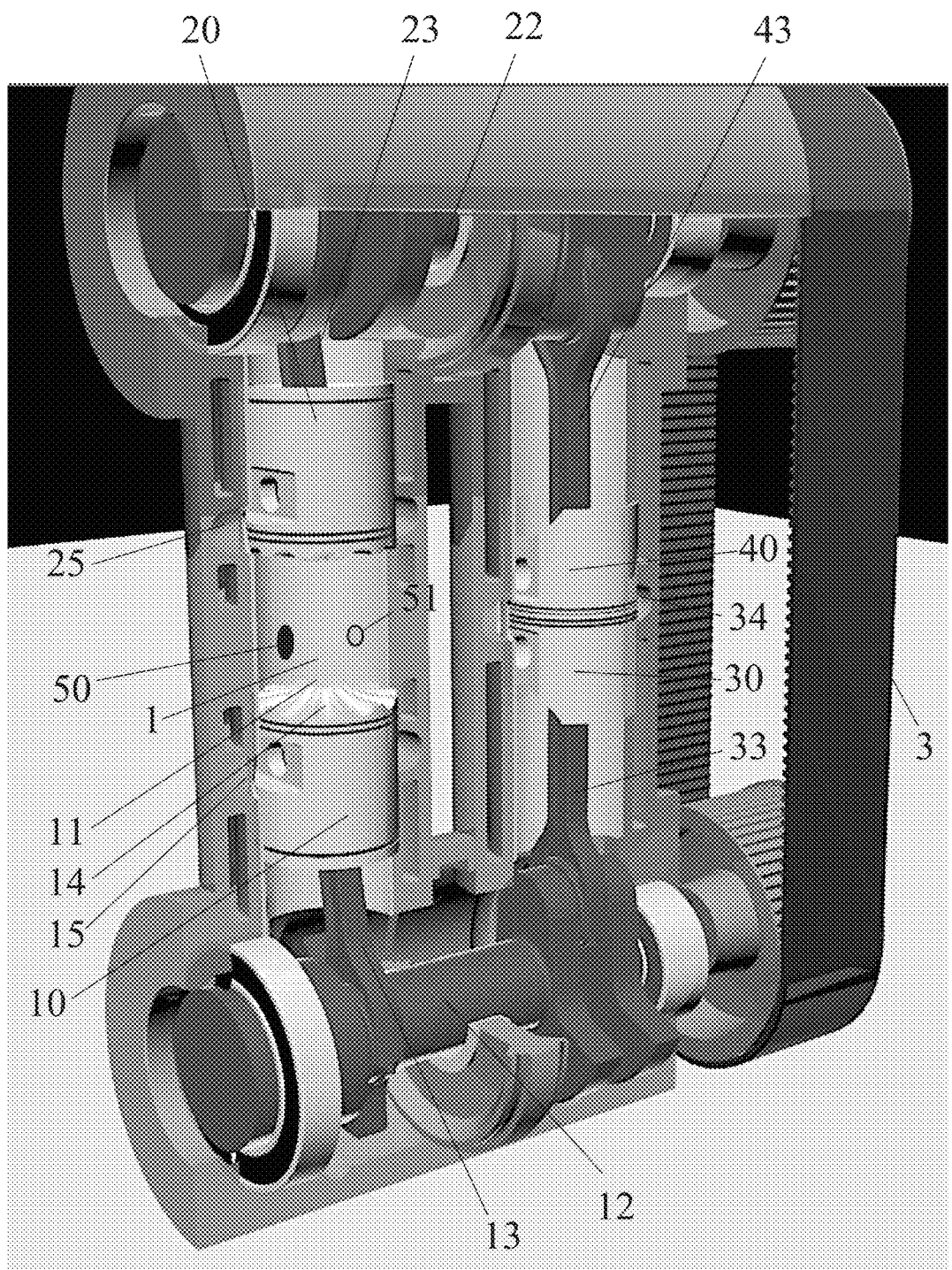
FIG. 2 illustrates the same engine as in FIG. 1, however, in a position already when both working pistons (10; 20) are in the movement from their BDC towards the top dead centre (TDC).
Figure 3:
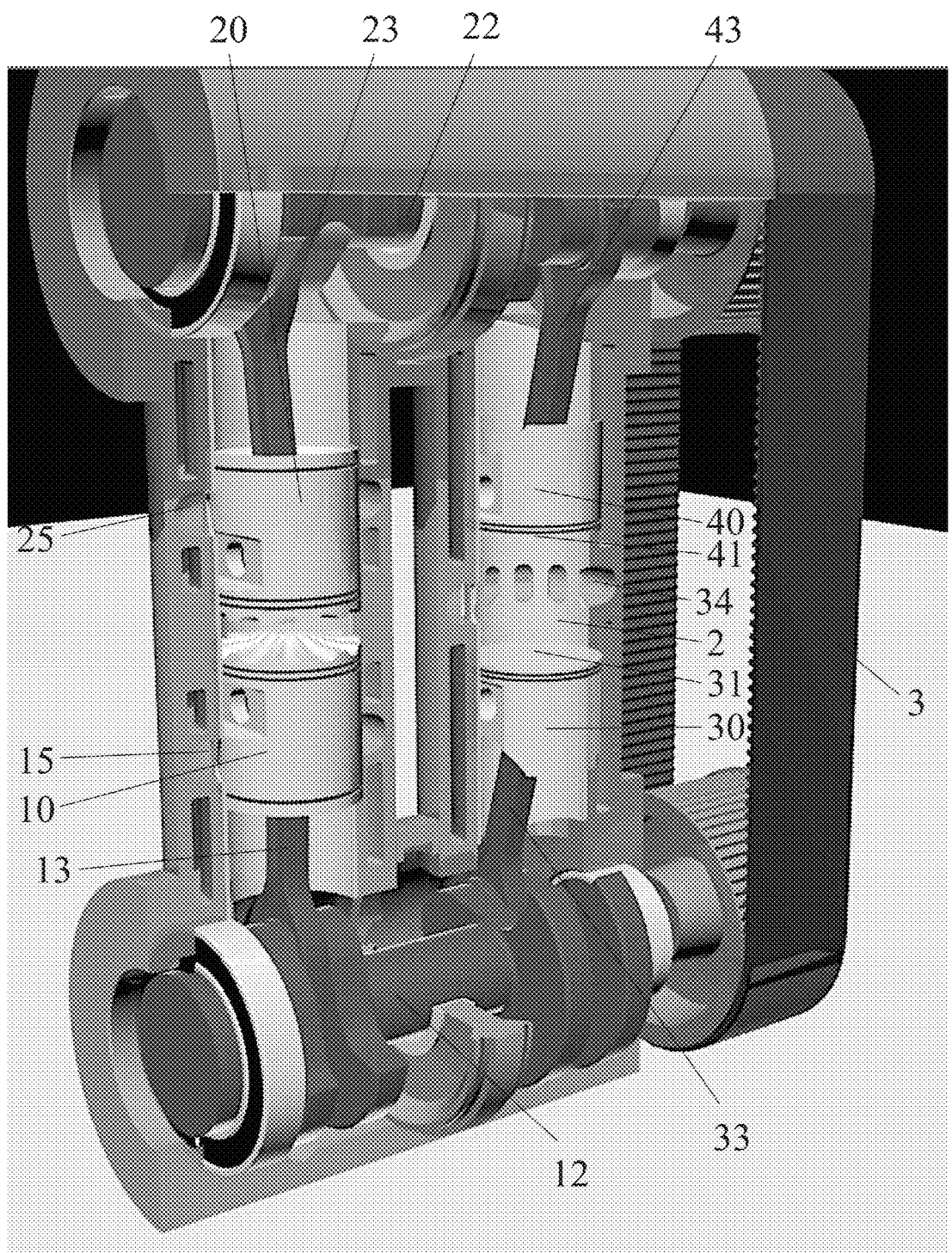
FIG. 3 illustrates the same engine as in FIGS. 1 and 2, however, in a position when both working pistons (10; 20) are in their TDC already, forming the compression space.
Figure 4:
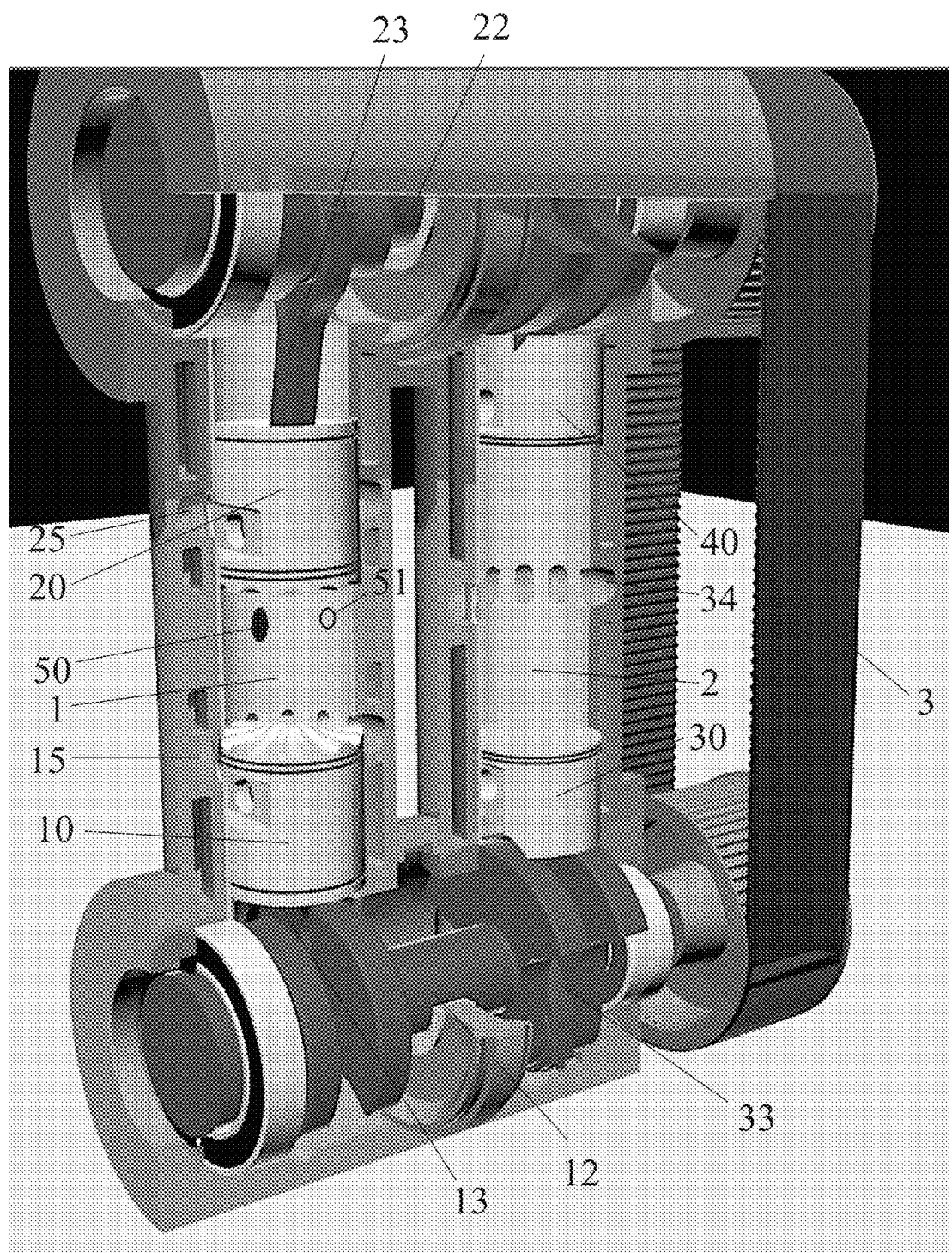
FIG. 4 illustrates the same engine as in FIGS. 1 to 3, however, in a position when both working pistons (10; 20) are in the movement from the TDC to the BDC, and gases present in the cylinder (1) expand.

The examples of the implementation of the invention have been described with reference to the drawings in order to illustrate the objectives, the advantages, and the efficiency of the present invention.

FIGS. 1 to 4 illustrate the opposed-piston internal combustion engine comprising a working cylinder (1), a first working piston (10), and a second working piston (20), where the heads (11; 21) of both working pistons (10; 20) are opposed to each other. The head (11; 21) of each working piston (10; 20) in its cross-section has a shape of a truncated cone with slightly concaved lateral sides. Furthermore, on the head (11; 21) of each working piston recesses (14; 24) radially extending from the central portion of the head (11; 21) to the sides of the head (11; 21) are formed. The engine comprises a first crankshaft (12) and a second crankshaft (22). The first working piston (10) is connected to the first crankshaft (12) through a first working rod (13), and the second working piston (20) is connected to the second crankshaft (22) through a second working rod (23). Furthermore, the shift of the phase (X) of the first working rod (13) of the first crankshaft (12) from the phase of the second working rod (23) of the second crankshaft (22) is 45 degrees which is especially visible in FIG. 5. The engine also comprises the inlet ports (25) formed on the working cylinder (1) in the stroke area of the second working piston (20), and outlet ports (15) formed on the working cylinder (1) in the stroke area of the first working piston (10). The number of inlet ports (25) and outlet ports (15) coincides with the number of recessions (14; 24) on the head (11; 21) of the piston. The engine also comprises a spark plug (50) arranged in the central portion of the working chamber of the working cylinder (1) and a fuel injection nozzle (51) arranged in the central portion of the working cylinder (1).

The arrangement positions of the spark plug (50) and the fuel injection nozzle (51) are schematically illustrated in FIGS. 1 to 4. The engine can comprise three or even six spark plugs (50) and two or three fuel injection nozzles (51) in different versions thereof. The engine further comprises a compressor cylinder (2) located adjacent to the working cylinder (1), as well as a first compressor piston (30) and a second compressor piston (40), where the heads (31;41) of the compressor pistons (30;40) are opposed to each other. The first compressor piston (30) is connected to the first crankshaft (12) through the first compressor rod (33), and the second compressor piston (40) is connected to the second crankshaft (22) through the second compressor rod (43). The shift of the phase (Y) of second compressor rod (43) of the second crankshaft (22), in its turn, from the phase of the second working rod (23) of the second crankshaft (22) is 108.4 degrees, especially visible in FIG. 5. There are air-exchange ports (34) in the central portion of the compressor cylinder (2) configured such as to provide the air inflow and outflow from the compressor cylinder (2). The engine comprises a crankshaft transmission (3) coupling the first crankshaft (12) with the second crankshaft (22).

Furthermore, the engine comprises a compressed-air overflow channel (52) providing a fluid connection between the compressor cylinder (2) and the working cylinder (1) such that air compressed in the compressor cylinder (2) can be moved to the working cylinder (1) through the inlet port (25) thereof. The arrangement of the air overflow channel (52) is schematically illustrated in FIGS. 5 to 13. The air overflow channel (52), in its turn, although it is necessary for the engine, is not illustrated in FIGS. 1 to 4 in order not to overload the respective illustrations.

Figure 5:
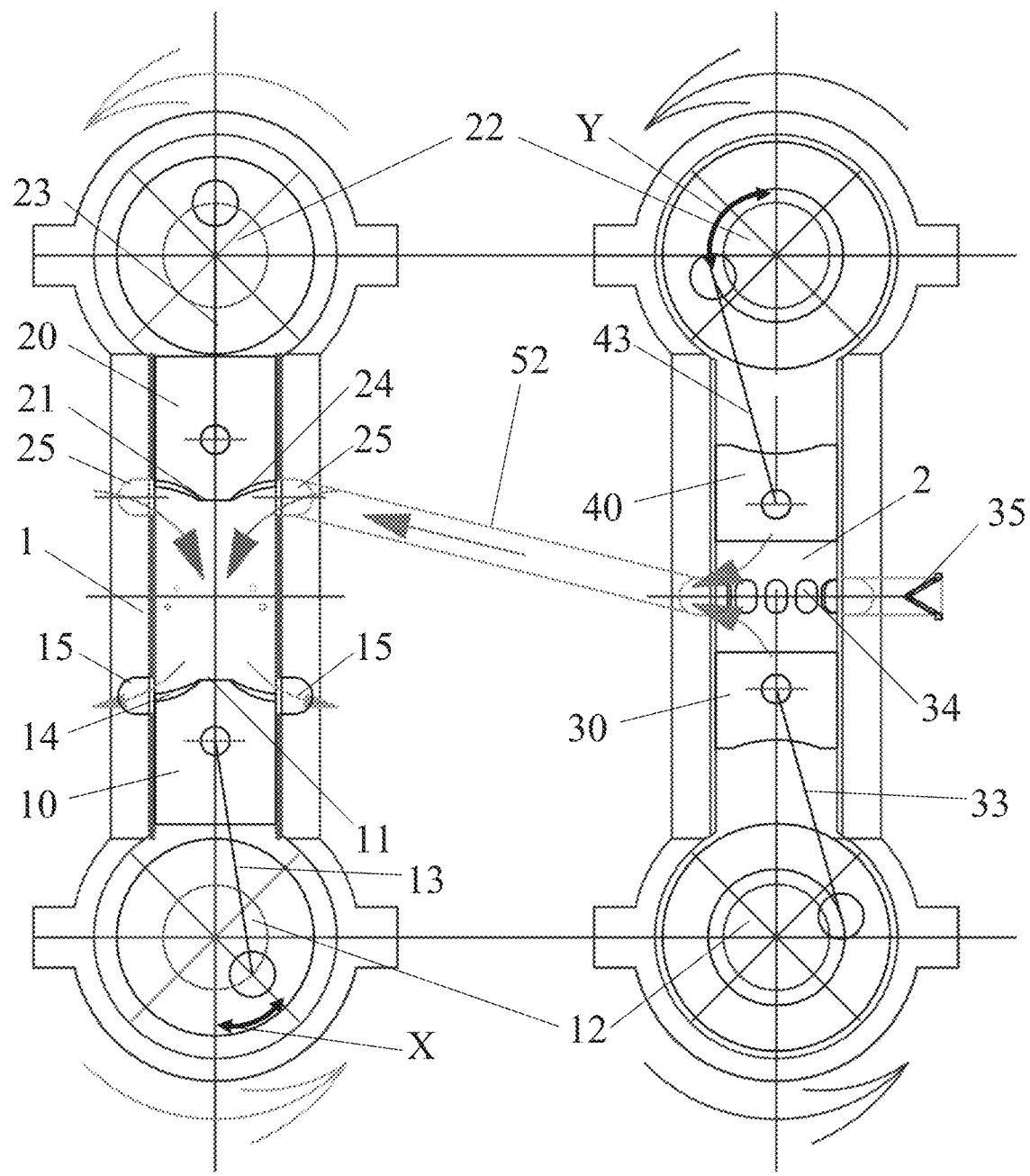
FIG. 5 illustrates the operational scheme of the opposed-piston internal combustion engine when the second working piston (20) is in the BDC, and the position of its second working rod (23) is 0 degrees. At the same time, the first working rod (13) of the first working piston (10) has a phase shift (X) of 45 degrees in relation to the second working piston (20).

FIG. 5 illustrates the operational scheme of the opposed-piston internal combustion engine when the second working piston (20) is in the BDC, and the position of its second working rod (23) on the second crankshaft (22) is 0 degrees. At the same time, the position of the first working rod (13) of the first working piston (10) at the first crankshaft (12) in relation to the position of the second working piston (20) on the second crankshaft (22) has a phase shift (X) of 45 degrees. In this condition air coming from the compressor piston (2) is forced into the working piston (1) through the inlet port (25), and the previously burnt exhaust gases—driven out through the outlet port (15). In this condition the inlet port (25) is completely open. The outlet port (15), in its turn, is partially open. The compressor pistons (30; 40) present in the compressor cylinder (2), in their turn, continue their movement towards each other forcing the compressed air through the air-exchange port (34) to the compressed-air overflow channel (52) and further—to the working cylinder (1).

Figure 6:
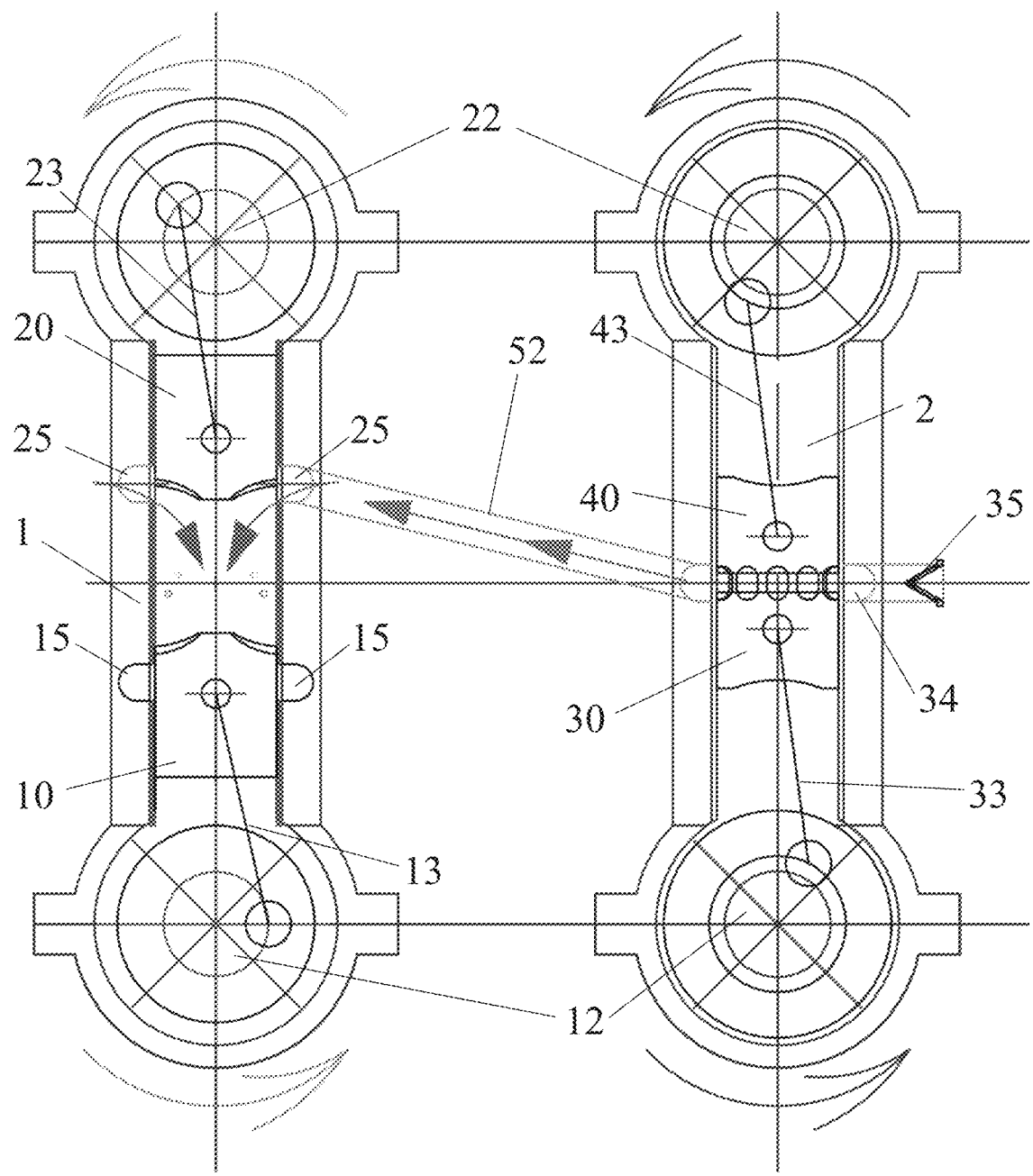
FIG. 6 illustrates the operational scheme of the engine, illustrated already in FIG. 5, when the second working rod (23) of the second working piston (20) has moved 45 degrees.

FIG. 6 illustrates the operational scheme of the engine, illustrated already in FIG. 5, when the second working rod (23) of the second working piston (20) has moved or the second crankshaft (22) has rotated 45 degrees. Both working pistons (10;20) continue movement towards each other. The outlet port (15) is closed already. However, the inlet port (15) is gradually being closed or covered by the displacement of the second working piston (20) in the direction towards the first working piston (10). Compression of air present in the working cylinder (1) begins. The compressor pistons (30; 40) have almost reached their TDC—approximately 20 degrees of crankshaft rotation up to the TDC. The still-forced air is also being directed to the working cylinder (1).

Figure 7:
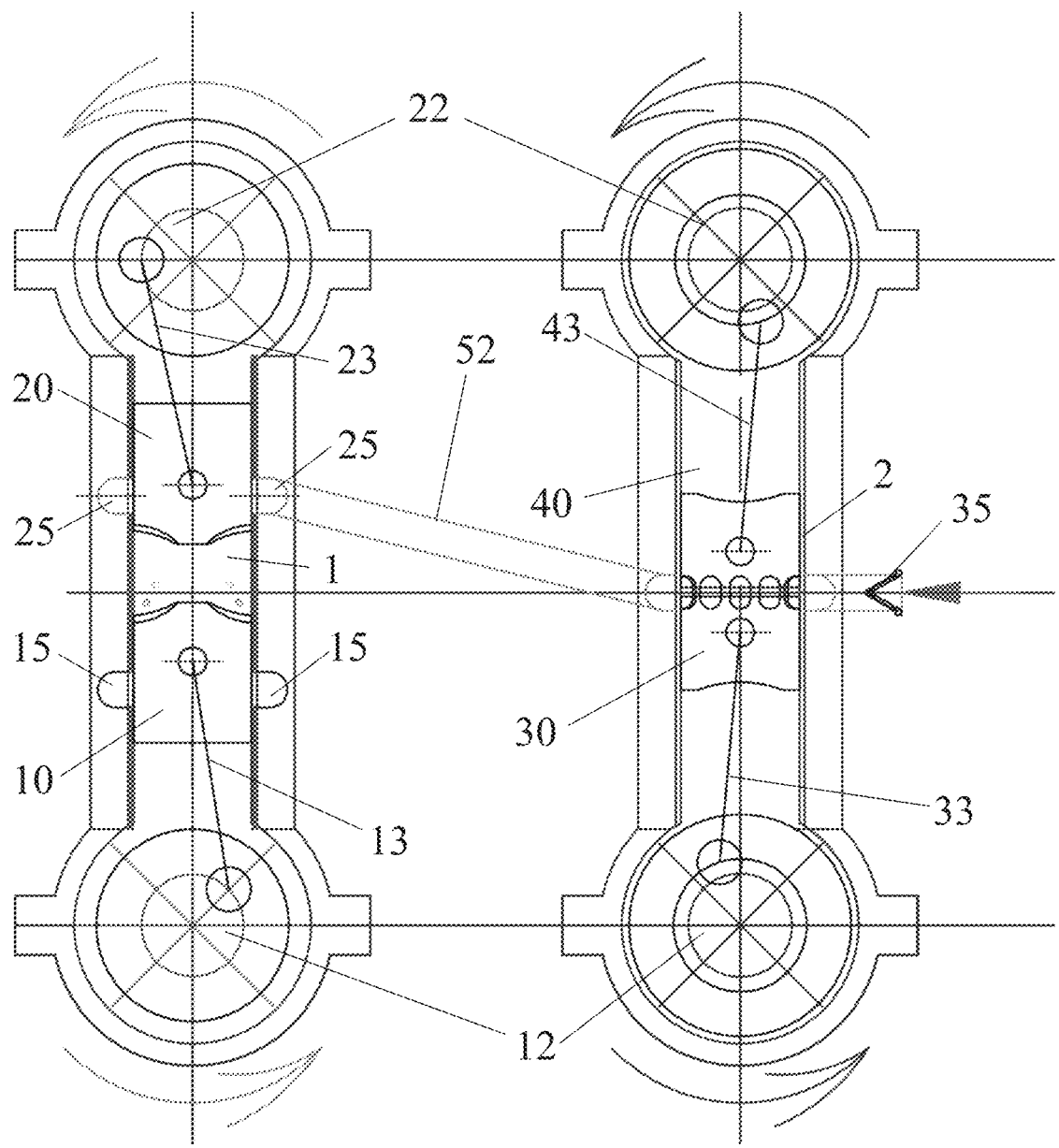
FIG. 7 illustrates the operational scheme of the engine, illustrated already in FIGS. 5 and 6, when the second working rod (23) of the second working piston (20) has moved 90 degrees.

FIG. 7 illustrates the operational scheme of the engine, illustrated in FIGS. 5 and 6, when the second working rod (23) of the second working piston (20) has moved or the second crankshaft (22) has rotated 90 degrees. Both working pistons (10; 20) continue movement towards each other. The outlet port (15) and the inlet port (25) are closed. The compressor pistons (30; 40) have already reached the TDC—approximately 20 degrees of crankshaft rotation over the TDC—and are moving to their BDC. The air-exchange port (34) is being opened in order for the compressor cylinder (2) to be able to suck in the next portion of air.

Figure 8:
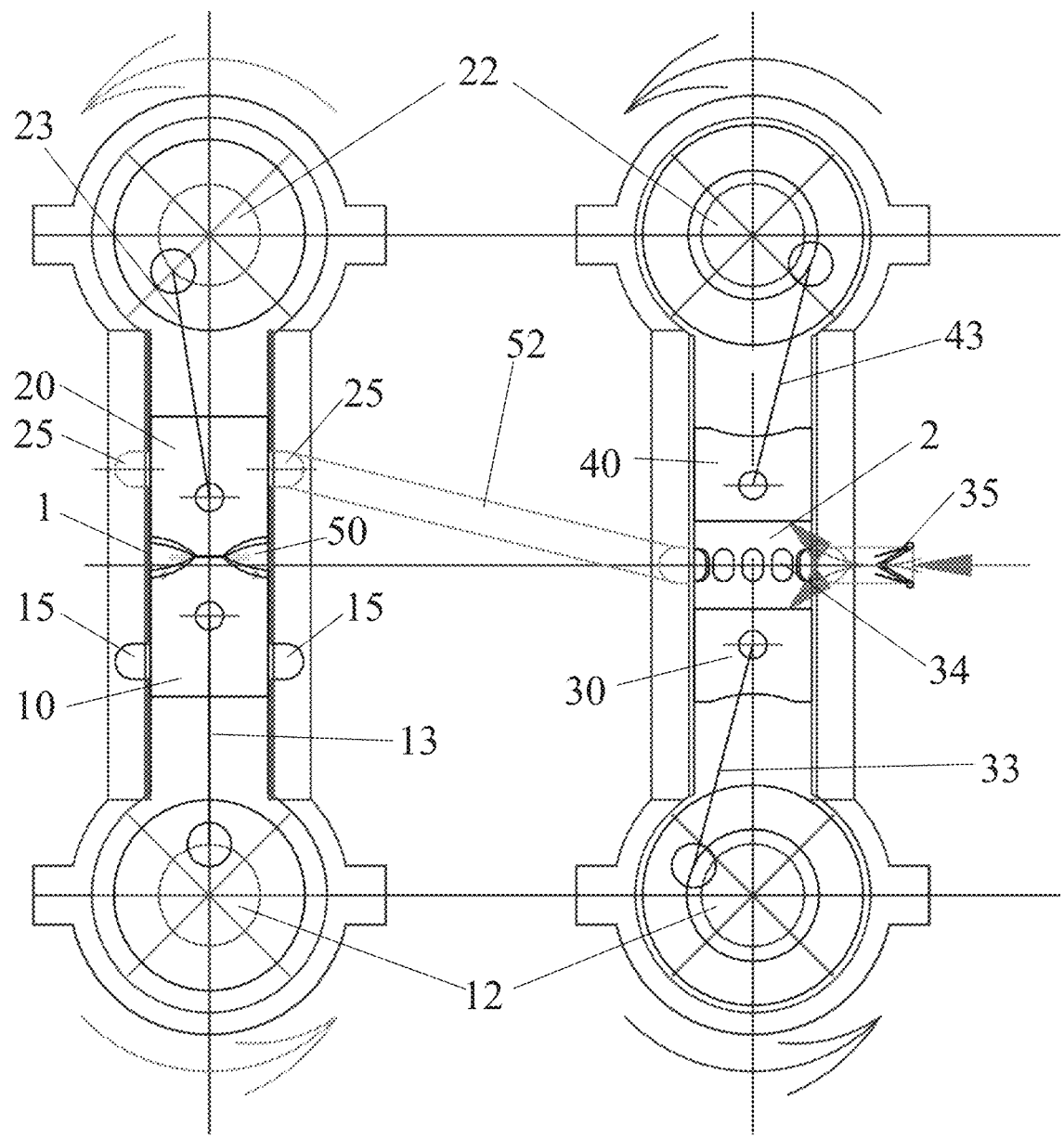
FIG. 8 illustrates the operational scheme of the engine, illustrated already in FIGS. 5 to 7, when the second working rod (23) of the second working piston (20) has moved 135 degrees.

FIG. 8 illustrates the operational scheme of the engine, illustrated already in FIGS. 5 to 7, when the second working rod (23) of the second working piston (20) has moved or the second crankshaft (22) has rotated 135 degrees. Both working pistons (10; 20) are closest to each other. The first working piston (10) has reached the TDC. A toroidal combustion chamber (50) is formed between the curved surfaces of the pistons (10; 20). Fuel is injected. The compressor pistons (30; 40), in their turn, suck in a new portion of air through the air-exchange port (34) and the non-return air valve (35).

Figure 9:
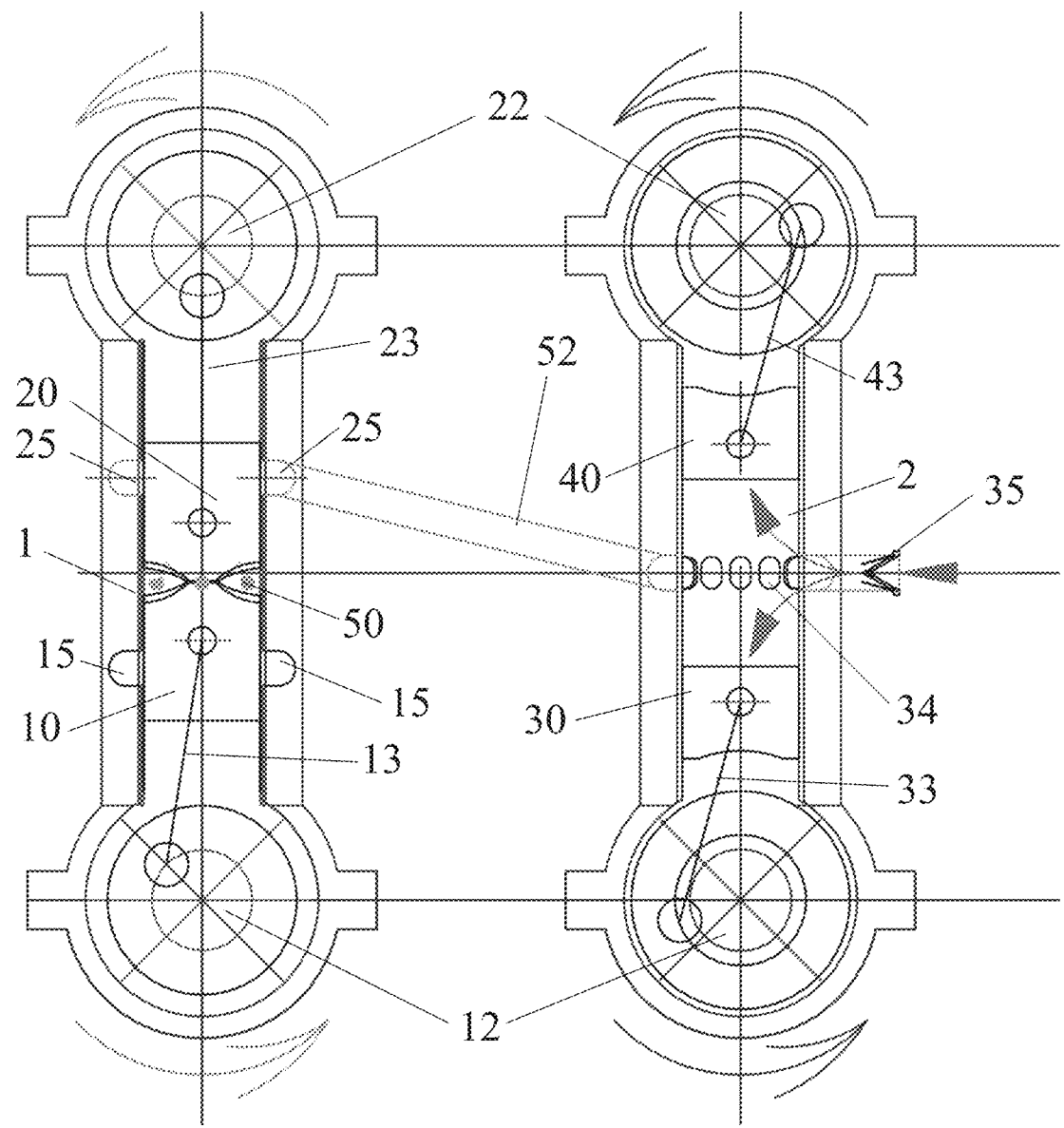
FIG. 9 illustrates the operational scheme of the engine, illustrated already in FIGS. 5 to 8, when the second working rod (23) of the second working piston (20) has moved 180 degrees.

FIG. 9 illustrates the operational scheme of the engine, illustrated already in FIGS. 5 to 8, when the second working rod (23) of the second working piston (20) has moved or the second crankshaft (22) has rotated 180 degrees. Both working pistons (10;20) are still closest to each other. A toroidal combustion chamber (50) is still formed between the curved surfaces of the pistons (10;20). The second working piston (20) has reached the TDC. The first working piston (10), in its turn, is already on the move to the BDC. At this phase also firing of the combustible mixture in the toroidal combustion chamber (50) takes place. The compressor pistons (30;40), in their turn, still suck in a new portion of air through the air-exchange port (34).

Figure 10:
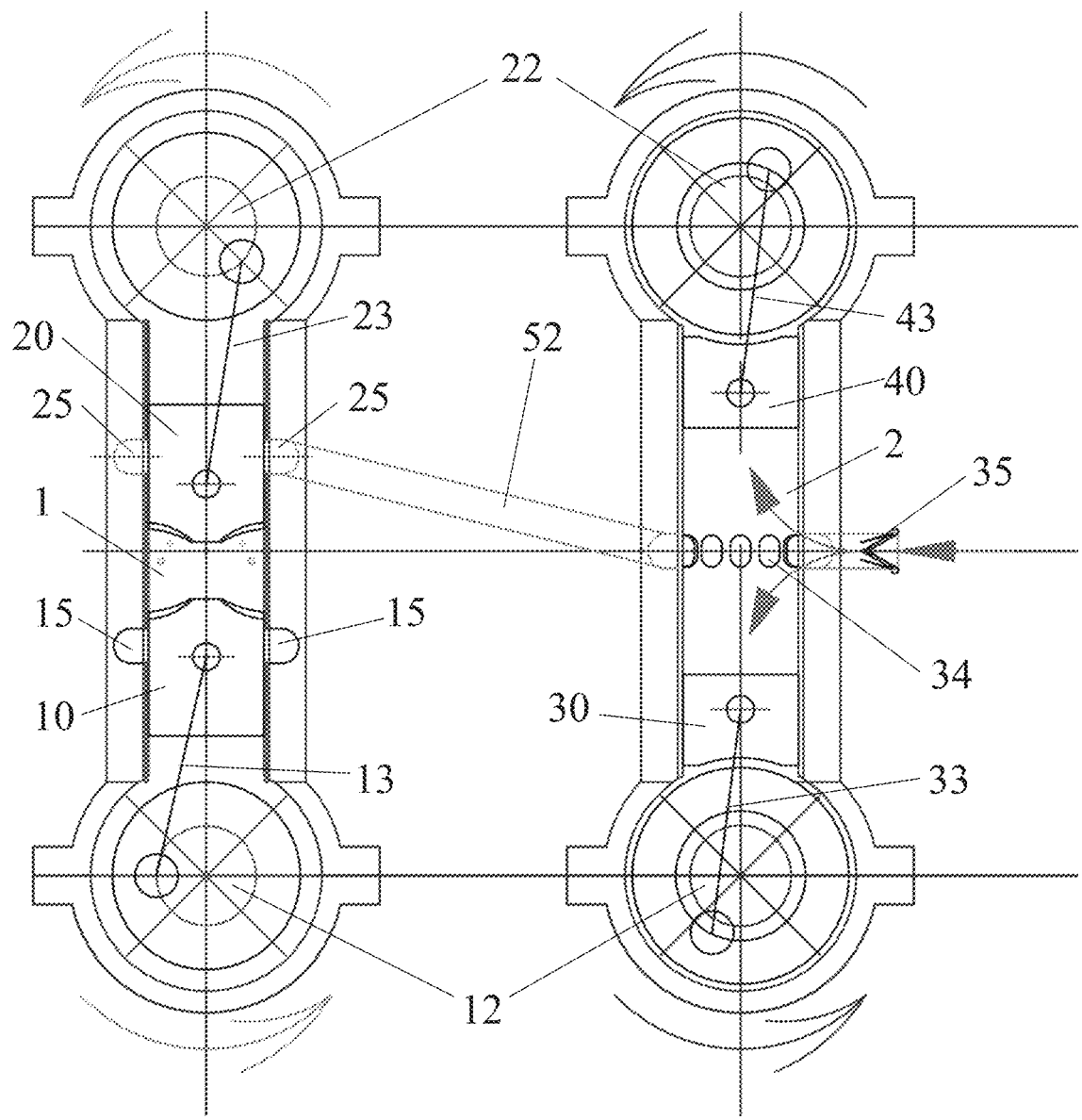
FIG. 10 illustrates the operational scheme of the engine, illustrated already in FIGS. 5 to 9, when the second working rod (23) of the second working piston (20) has moved 225 degrees.

FIG. 10 illustrates the operational scheme of the engine, illustrated already in FIGS. 5 to 9, when the second working rod (23) of the second working piston (20) has moved or the second crankshaft (22) has rotated 225 degrees. Both working pistons (10;20) move away from each other in the direction towards the BDC. A working stroke takes place. The compressor pistons (30;40), in their turn, still suck in a new portion of air through the air-exchange port (34).

Figure 11:
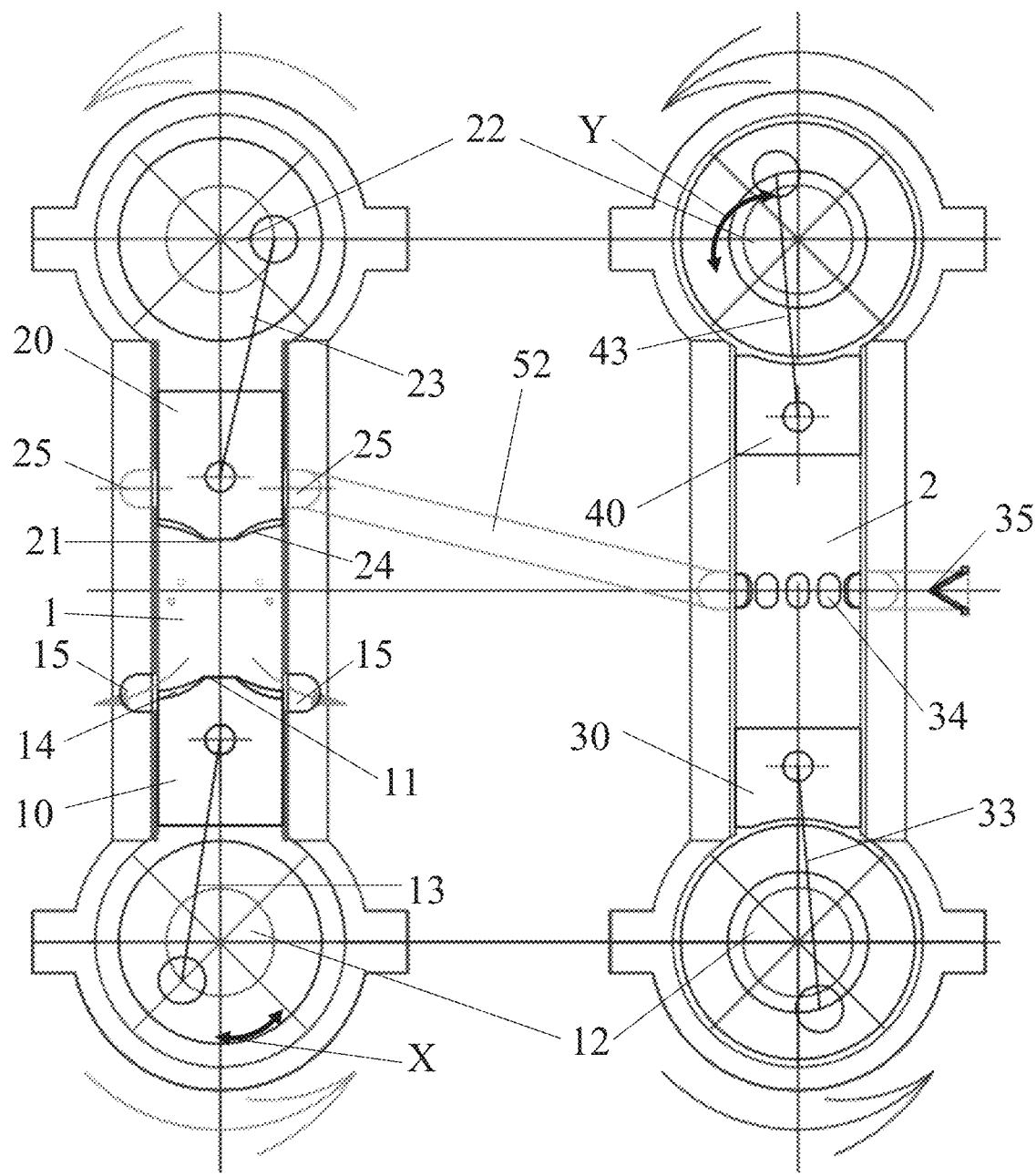
FIG. 11 illustrates the operational scheme of the engine, illustrated already in FIGS. 5 to 10, when the second working rod (23) of the second working piston (20) has moved 270 degrees.

FIG. 11 illustrates the operational scheme of the engine, illustrated already in FIGS. 5 to 10, when the second working rod (23) of the second working piston (20) has moved or the second crankshaft (22) has rotated 270 degrees. The first working piston (10) has already reached the position when it opens the outlet port (15), and the burnt gases can escape the working cylinder (1). The inlet ports (25), in their turn, are still closed/begin to close gradually. A further air inflow into the compressor cylinder (2) does not take place anymore, and the air already present in the compressor cylinder (2) is guided to the working cylinder (1) in order to fill the working cylinder (1) with a new portion of air and to drive out the burnt gases.

Figure 12:
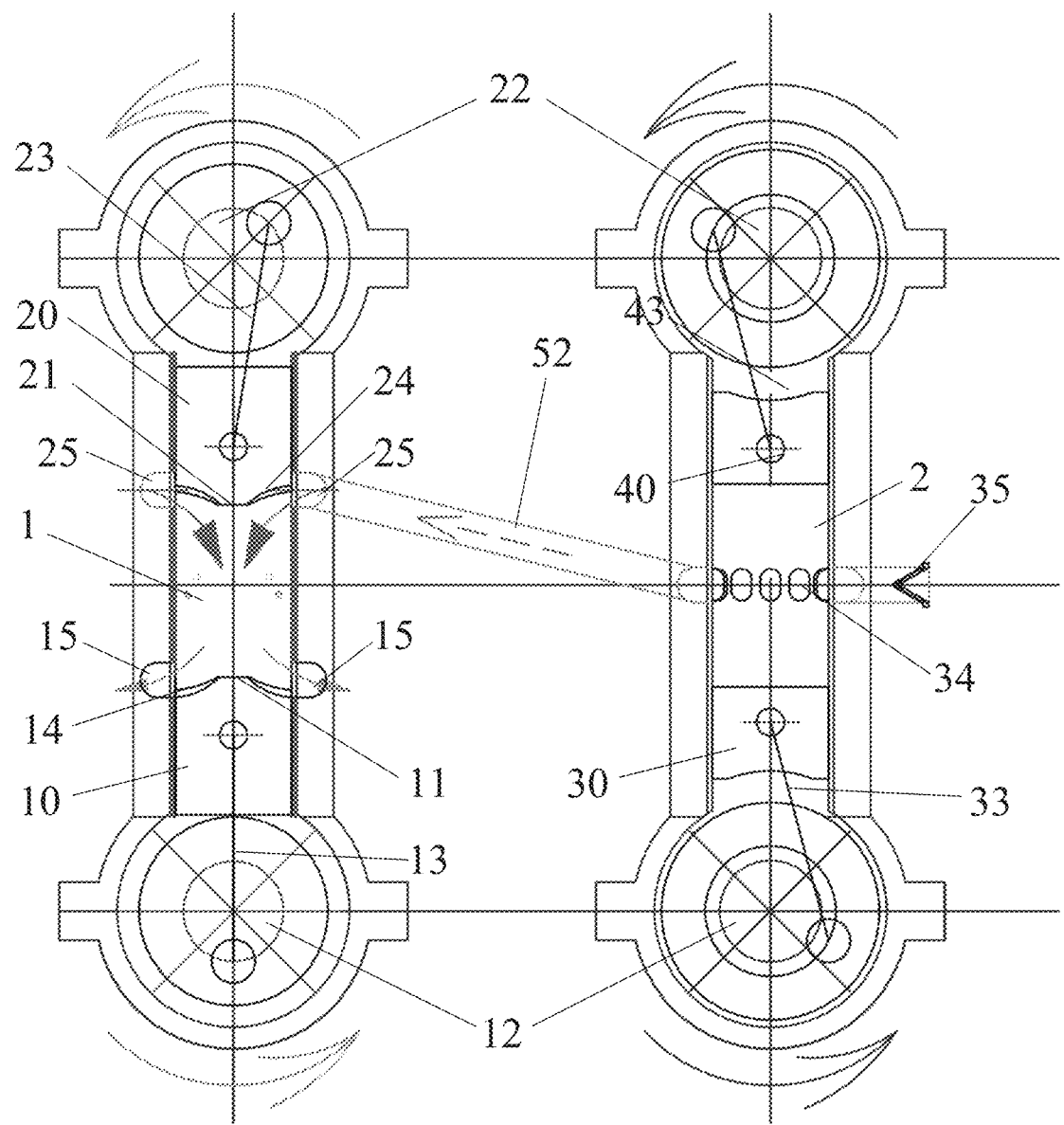
FIG. 12 illustrates the operational scheme of the engine, illustrated already in FIGS. 5 to 11, when the second working rod (23) of the second working piston (20) has moved 315 degrees.

FIG. 12 illustrates the operational scheme of the engine, illustrated already in FIGS. 5 to 11, when the second working rod (23) of the second working piston (20) has moved or the second crankshaft (22) has rotated 315 degrees. The first working piston (10) has reached the BDC. The outlet ports (15) are completely open. The inlet ports (25) are partially open, and the air being driven from the compressor cylinder (2) flows in through them. The inflowing air also facilitates the removal of the burnt gases through the outlet port (15).

Figure 13:
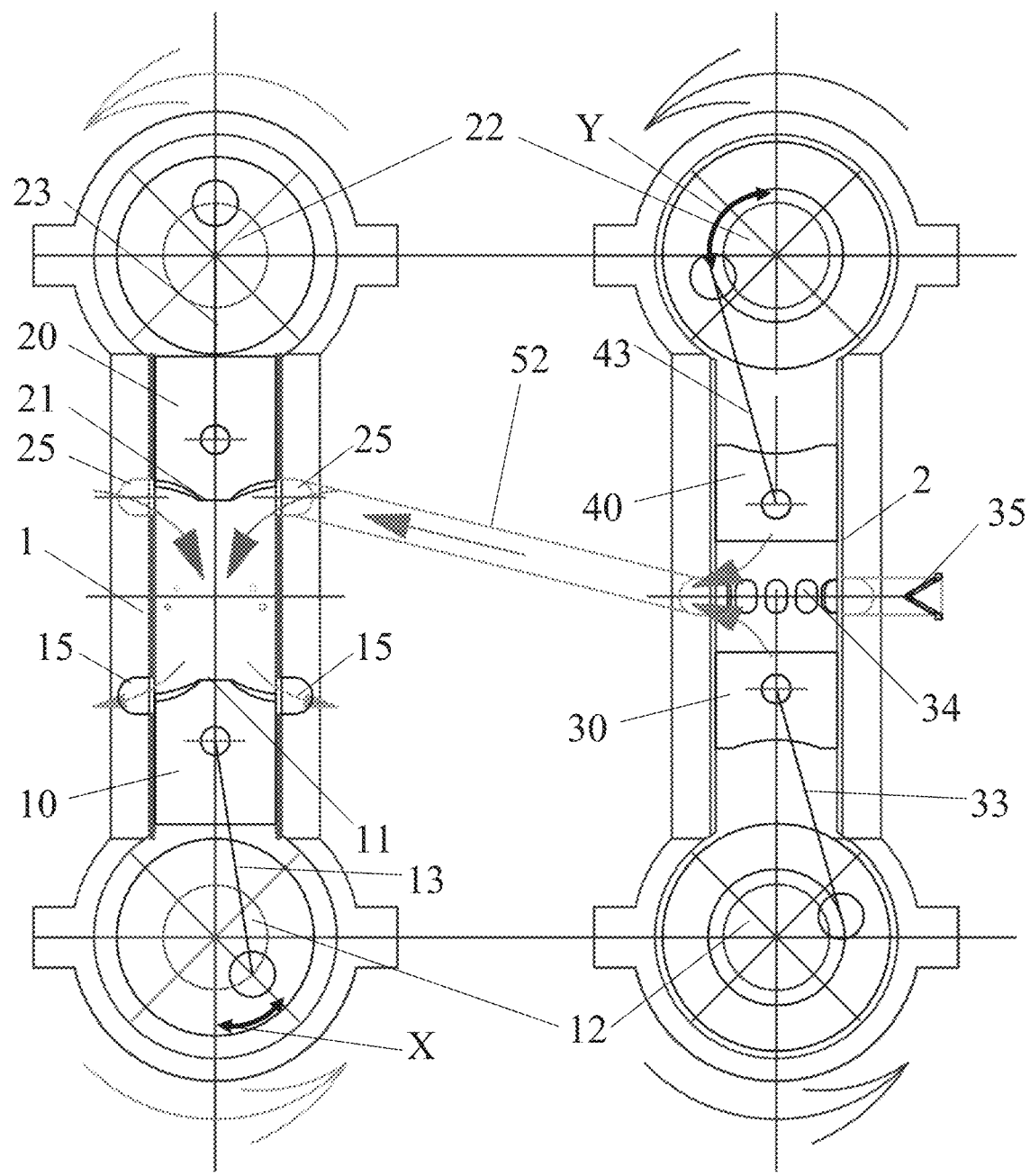
FIG. 13 illustrates the operational scheme of the engine, illustrated already in FIGS. 5 to 12, when the second working rod (23) of the second working piston (20) has moved 360 degrees or has returned to its initial position, as shown in FIG. 5, which is 0 degrees.

FIG. 13 illustrates the operational scheme of the engine, illustrated already in FIGS. 5 to 12, when the second working rod (23) of the second working piston (20) has moved or the second crankshaft (22) has rotated 360 degrees, or has returned to its initial position, as shown in FIG. 5, which is 0 degrees. The air coming from the compressor cylinder (2), in its turn, is still being driven to the working cylinder (1), and the burnt gases are even more being driven out. And the whole two-stroke cycle is resumed from the beginning as described before.

Although the object of the invention may be subjected to different modifications and alternative forms, where some of the embodiments of the object of the invention are shown in the drawings, it must be understood that the invention is not intended to be limited to the embodiments specifically described herein. The invention rather includes all the modifications, equivalents, and alternatives which fall within the scope of protection of the object of the invention set out in the claims.

The invention claimed is:

1. An opposed-piston internal combustion engine comprising:
   a working cylinder (1),
   a first working piston (10) and a second working piston (20), where respective heads (11;21) of both working pistons (10;20) are opposed to each other,
   a first crankshaft (12) and a second crankshaft (22), wherein the first working piston (10) is connected to the first crankshaft (12) through a first working rod (13), and the second working piston (20) is connected to the second crankshaft (22) through a second working rod (23), wherein a phase shift (X) of the first working rod (13) of the first crankshaft (12) from a phase of the second working rod (23) of the second crankshaft (22) is in the range from 15 to 75 degrees,
   an inlet port (25) formed on the working cylinder (1) in the stroke area of the second working piston (20),
   an outlet port (15) formed on the working cylinder (1) in the stroke area of the first working piston (10),
   a spark plug (50) arranged in a central portion of the working chamber,
   a fuel injection nozzle (51) arranged in the central portion of the working cylinder (1),
   a compressor cylinder (2) located adjacent to the working cylinder (1),
   a first compressor piston (30) and a second compressor piston (40), where heads (31; 41) of the compressor pistons (30; 40) are opposed to each other, wherein the first compressor piston (30) is connected to the first crankshaft (12) through a first compressor rod (33), and the second compressor piston (40) is connected to the second crankshaft (22) through a second compressor rod (43), wherein a phase shift (Y) of second compressor rod (43) of the second crankshaft (22) from a phase of the second working rod (23) of the second crankshaft (22) is in the range from 80 to 150,
   an air-exchange port (34) formed in a central portion of the compressor cylinder (2) and configured such as to provide an air inflow and outflow from the compressor cylinder (2),
   a compressed-air overflow channel (52) providing a fluid connection between the compressor cylinder (2) and the working cylinder (1) such that air compressed in the compressor cylinder (2) can be moved to the working cylinder (1) through the inlet port (25) thereof, and
   a crankshaft transmission (3) coupling the first crankshaft (12) with the second crankshaft (22), characterised in that the head (11; 21) of each working piston (10; 20) in its cross-section is in the form of a truncated cone, and wherein on the head (11; 21) of each working piston (10; 20) recesses (14; 24) radially extending from a central portion of the head (11; 21) to sides of the head (11; 21) are formed.

2. The opposed-piston internal combustion engine according to claim 1, characterised in that the truncated cone has concaved lateral sides.

3. The opposed-piston internal combustion engine according to claim 1, characterised in that the working volume of the compressor cylinder (2) is 10 to 50% higher than the working volume of the working cylinder (1).

4. The opposed-piston internal combustion engine according to claim 1, characterised in that the engine comprises at least three spark plugs (50).

5. The opposed-piston internal combustion engine according to claim 1, characterised in that the engine comprises at least two fuel injection nozzles (51).

* * * * *